United States Patent [19]

Tanahashi et al.

[11] Patent Number: 5,014,257

[45] Date of Patent: May 7, 1991

[54] OPTICAL READOUT CIRCUIT FOR PRODUCING WAVEFORMS HAVING SHARP EDGES

[75] Inventors: Yutaka Tanahashi; Toshihiko Takahashi, both of Tokyo, Japan

[73] Assignee: NEC Corporation, Tokyo, Japan

[21] Appl. No.: 260,095

[22] Filed: Oct. 20, 1988

[30] Foreign Application Priority Data

Oct. 20, 1987 [JP] Japan ............................. 62-265598

[51] Int. Cl.$^5$ ............................................... G11B 7/00
[52] U.S. Cl. ...................................... 369/59; 369/124
[58] Field of Search .................. 369/124, 44.41, 44.42, 369/59; 250/202

[56] References Cited

U.S. PATENT DOCUMENTS

| 4,520,469 | 5/1985 | Todokoro et al. | 369/44.41 |
| 4,525,825 | 6/1985 | Ito et al. | 369/44.41 |
| 4,603,410 | 7/1986 | Yoshida | 369/44.41 |
| 4,689,778 | 8/1987 | Miura et al. | 369/44.41 |
| 4,744,069 | 5/1988 | Sugiyama et al. | 369/44.41 |

Primary Examiner—Donald McElheny, Jr.
Attorney, Agent, or Firm—Sughrue, Mion, Zinn Macpeak & Seas

[57] ABSTRACT

An optical reading apparatus comprises a photodetector having equally divided first, second, third and fourth segments which are arranged in the path of light reflected from an optical recording medium. The first and second segments are aligned in a direction parallel to the track on the medium and the third and fourth segments are aligned in a direction perpendicular to the track. A readout circuit is provided for deriving an output A·a+B·b from the outputs of the first, second, third and fourth segments, where A and B represent constants, a represents a summed value of the outputs of the first, and second, third and fourth segments and b represents a summed value of the outputs of the first and second segments.

6 Claims, 3 Drawing Sheets

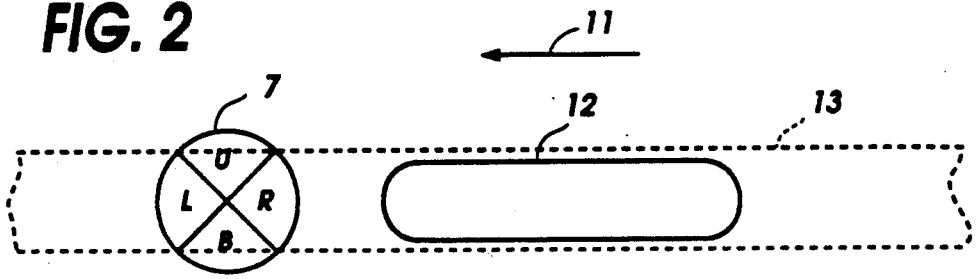
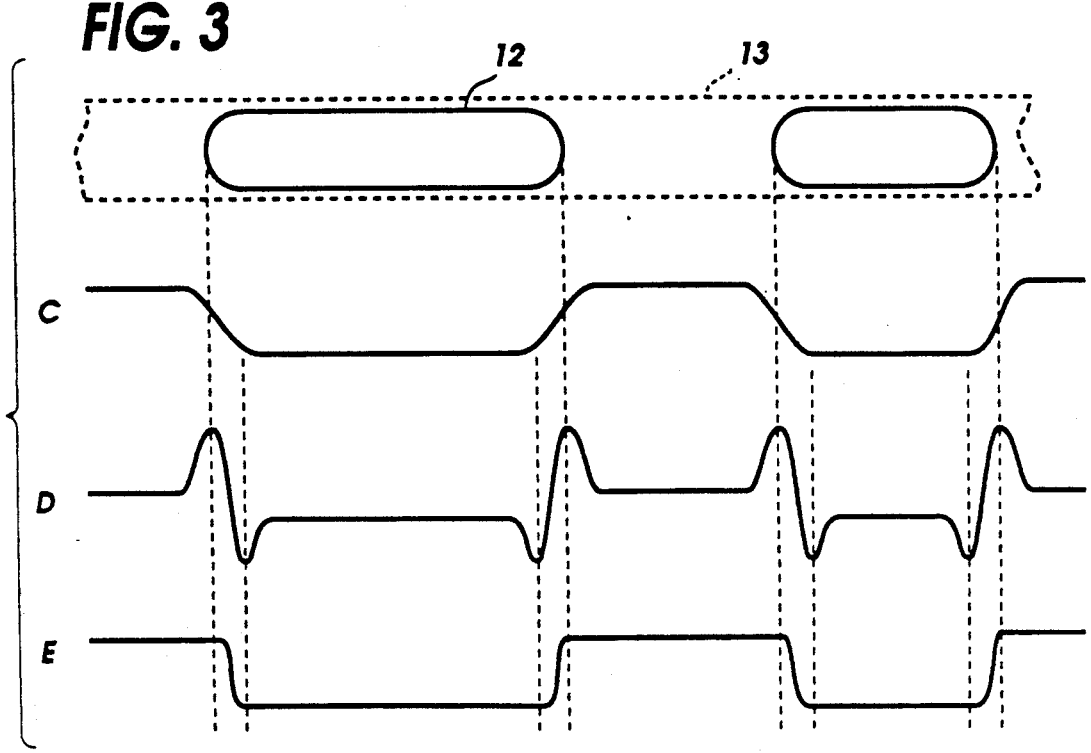
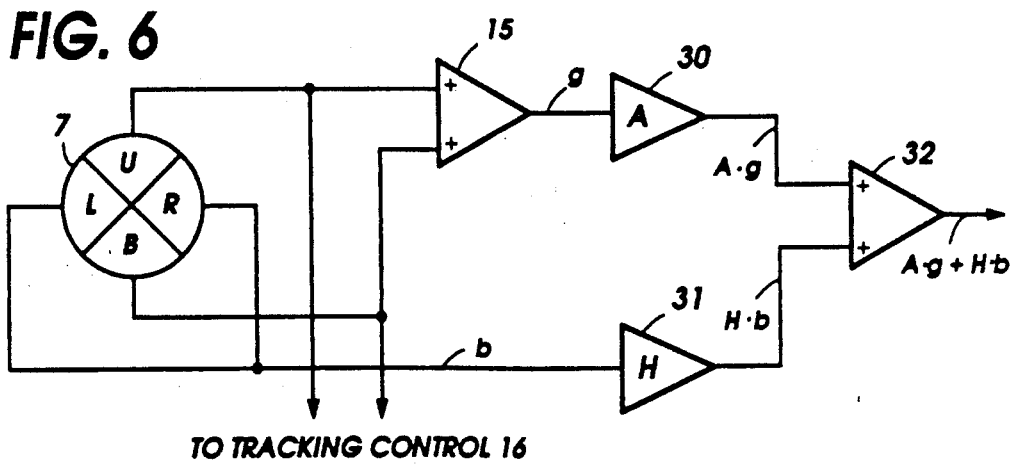

OPTICAL READOUT CIRCUIT FOR PRODUCING WAVEFORMS HAVING SHARP EDGES

BACKGROUND OF THE INVENTION

The present invention relates to an optical reading apparatus for detecting recorded information signals from optical disks.

For detecting information from an optical disk, a laser beam is focused on the disk and light reflected from it is detected by a photodetector, the ouptut of which is a logic-1 or logic-0 representing respectively the presence or absence of a microscopic pit on the disk. To obtain readout signals as well as tracking information, the surface of the photodetector is equally divided into four segments. The outputs of the segments aligned in a direction perpendicular to the track are applied to a tracking control ciruit and the outputs of all the segments are combined in a single summing amplifier to produce a readout signal. However, due to the finite size of the beam spot, the amount of reflection from the disk varies significantly as the beam falls on an edge of a pit and, as a result, the waveform of the readout signal has a large rise time at the leading edge and a large fall time at the trailing edge. The lack of sharpness at the edges of the photodetector waveform is likely to result in undesirable interference between adjacent information symbols if the storage density of pits is increased.

SUMMARY OF THE INVENTION

It is therefore an object of the present invention to provide an optical reading apparatus which produces a readout waveform having sharply defined edges.

In a broader aspect of the invention, the optical reading apparatus of the present invention comprises a photodetector having equally divided first, second, third and fourth segments which are arranged in the path of light reflected from an optical recording medium. The first and second segments are aligned in a direction parallel to the track on the medium and the third and fourth segments are aligned in a direction perpendicular to the track. A readout circuit is provided for deriving an output $Aa+Bb$ from the outputs of the first, second, third and fourth segments, where A and B represent constant values, a represents a summed value of the outputs of the first, second, third and fourth segments and b represents a summed value of the outputs of the first and second segments.

In a specific aspect, the outputs of the first, second, third and fourth segments are combined to produce a first output waveform having a slowly rising edge in response to a leading edge of a pit and a slowly falling edge in response to a trailing edge of the pit. The outputs of the first and second segments are combined to produce a second output waveform having a first series of an overshoot and an undershoot in response to the leading edge of the pit and a second series of an undershoot and an overshoot in response to the trailing edge of the pit. The first and second output waveforms are combined so that the overshoot and undershoot of the first series substantially cancel the slowly rising edge of the first output waveform and the undershoot and overshoot of the second series substantially cancel the slowly falling edge of the first output waveform. The outputs of the first, second, third and fourth segments may be jointly and linearly amplified by a first amplifier with gain A to produce an output signal $A \cdot a$ and the outputs of the first and second segments are jointly and linearly amplified by a second amplifier with a gain B to produce an output $B \cdot b$. The outputs of the first and second amplifiers are summed by an adder to produce the output $Aa+Bb$.

In a second aspect of the invention, the photodetector comprises first, second, third and fourth photodiodes, respectively, and the cathode terminals of all the photodiodes are jointly connected to a first end of a first resistor whose second end is connected to a first potential to develop a voltage $-A \cdot a$ thereacross. The anode terminals of the first and second photodiodes are jointly connected to a first end of a second resistor whose second end is connected to a anode, opposite potential to produce a voltage $B \cdot b$ thereacross. The second terminals of the third and fourth photodiodes are connected to a tracking control circuit. The difference between voltages developed at the first ends of the first and second resistors is detected by a differential amplifier to produce the output $Aa+Bb$.

In a further specific aspect, the readout circuit comprises a first linear amplifier with gain A for jointly amplifying the outputs of the third and fourth segments to produce an output $A \cdot g$, a second linear amplifier with gain H for jointly amplifying the outputs of the first and second segments to produce an output $H \cdot b$, and an adder for summing the outputs $A \cdot g$ and $H \cdot b$ to produce the output $Aa+Bb$.

BRIEF DESCRIPTION OF THE DRAWINGS

The present invention will be described in further detail with reference to the accompanying drawings, in which:

FIG. 2 is an illustration of the position of photodetector segments in relation to a track on an optical recording medium;

FIG. 3 is a waveform diagram associated with the FIG. 1 embodiment;

FIG. 6 is a circuit diagram of a readout circuit according to a third embodiment of the invention.

DETAILED DESCRIPTION

Figure 1:
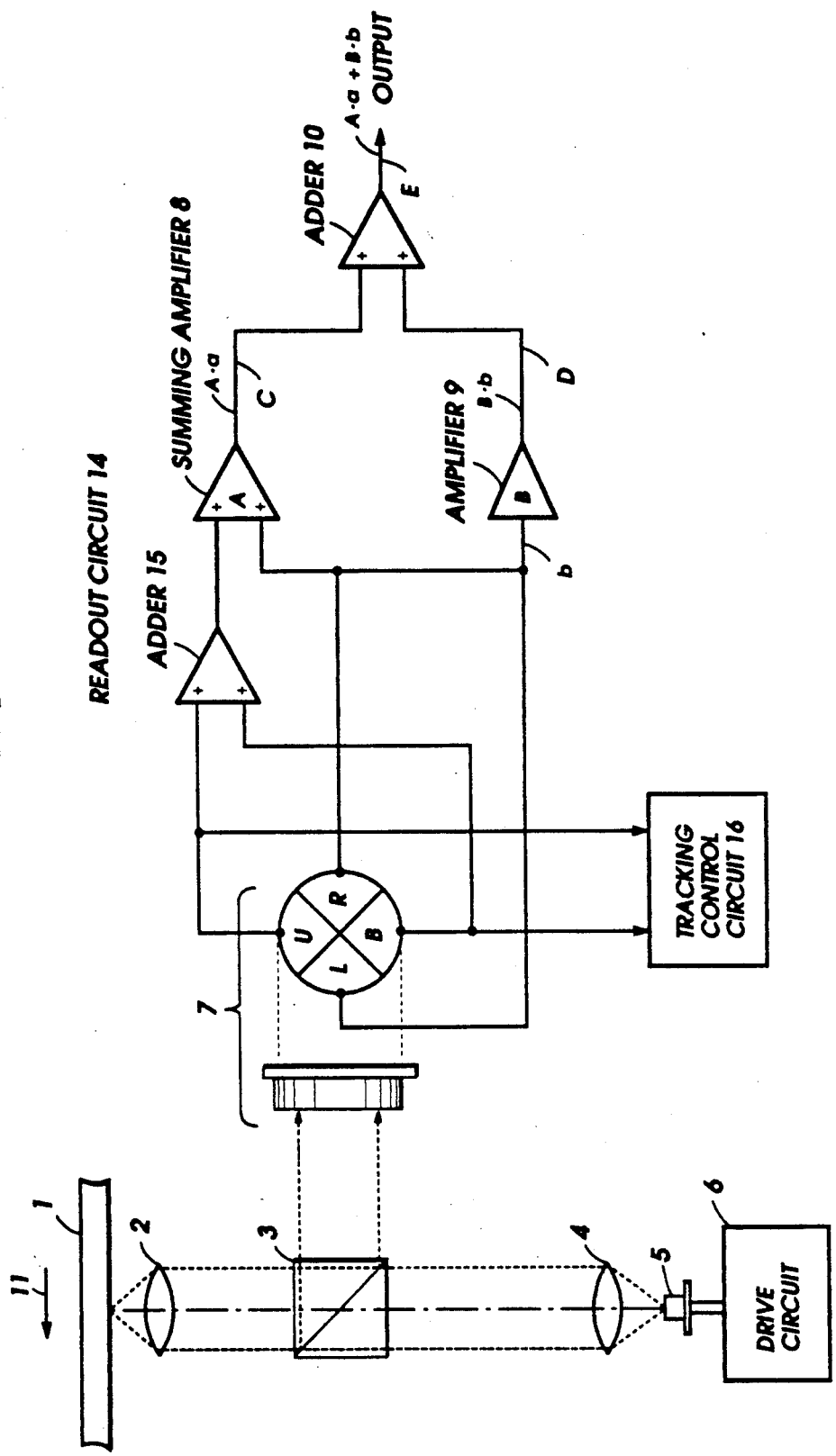
FIG. 1 is a diagram of an optical reading apparatus according to a first embodiment of the present invention.

In an optical reading apparatus of the invention shown in FIG. 1, a semiconductor laser 5 is excited by a driver 6 to emit laser light which is converged into parallel form by a collimator lens 4 and passed through a half mirror 3 to an object lens 2 where the light is converged into a focus on an optical recording medium 1 moving in a direction indicated by an arrow 11. Light reflected from the recording medium is picked up by object lens 2 and deflected by half mirror 3 onto a photodetector 7 which is segmented into four equal sectors, i.e., upper and bottom sectors, or segments U and B and left and right segments L and R. The upper and bottom segments U and B are aligned in a direction perpendicular to a track 13 to detect reflections from side edge portions of a pit 12 as shown in FIG. 2 and the left and right sectors L and R are aligned in a direction parallel to track 13 to receive reflections from the intermediate portion of the pit 12. The outputs of the upper and bottom segments U, B are supplied to a tracking control circuit 16 and to a readout circuit 14. Readout circuit 14 includes an adder 15 which serves to isolate the signals from the upper and bottom segments U and B applied to the tracking control circuit 16 as well as to provide a sum of these signals. The output of adder 15 is fed to a summing amplifier 8 with gain A.

The outputs of the left and right sectors L, R are connected together to the second input of the summing amplifier 8 and to linear amplifier 9 with gain B. Thus, all the outputs of the segments U, B, L and R of photodetector 7 are summed up and amplified into a negative-going rectangular waveform C as shown in FIG. 3 having a large rise time at the leading edge of the pit 12 and a large fall time at the trailing edge of the pit. Waveform C is represented by the relation A·a, where $a = \nu + \beta + \pi + \rho$, where $\nu, \beta, \lambda$ and $\rho$ are outputs of the segments U, B, L and R, respectively. On the other hand, the outputs of the left and right segments L, R are combined to produce a waveform D which is represented by the relation B·b, where $b = \lambda + \rho$. Due to the fact that reflections from the intermediate portion of a pit have a high content of the first or higher orders of diffraction as well as the major component of light detected, namely, the zeroth order of diffraction, the waveform D has a series of an overshoot and an undershoot at the leading edge of the pit 12 and a series of an undershoot and an overshoot at the trailing edge of the pit.

The outputs of the amplifiers 8 and 9 are connected to the adder 10 to produce an output A·a+Bb. The gains A and B of amplifiers 8 and 9 are adjusted so that the overshooting and undershooting components at the leading edge of waveform D cancel out the slowly varying rising edge of waveform C and the undershooting and overshooting components at the trailing edge of waveform D cancel out the slowly varying falling edge of waveform C to produce an output waveform E having a sharp transition at each of the leading and trailing edges.

Figure 4:
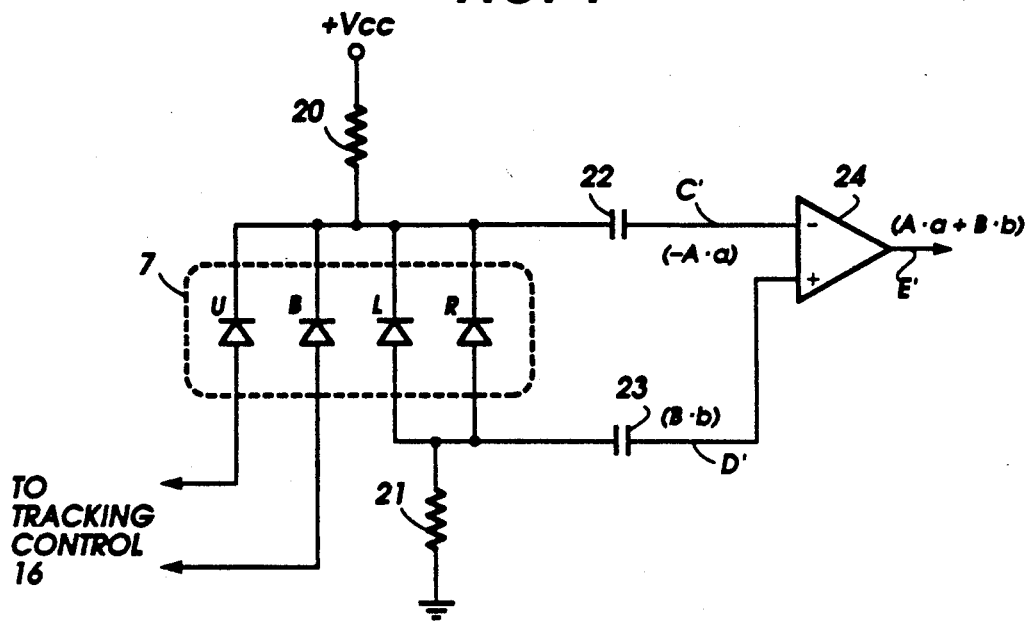
FIG. 4 is a circuit diagram of a readout circuit according to a second embodiment of the invention.
Figure 5:
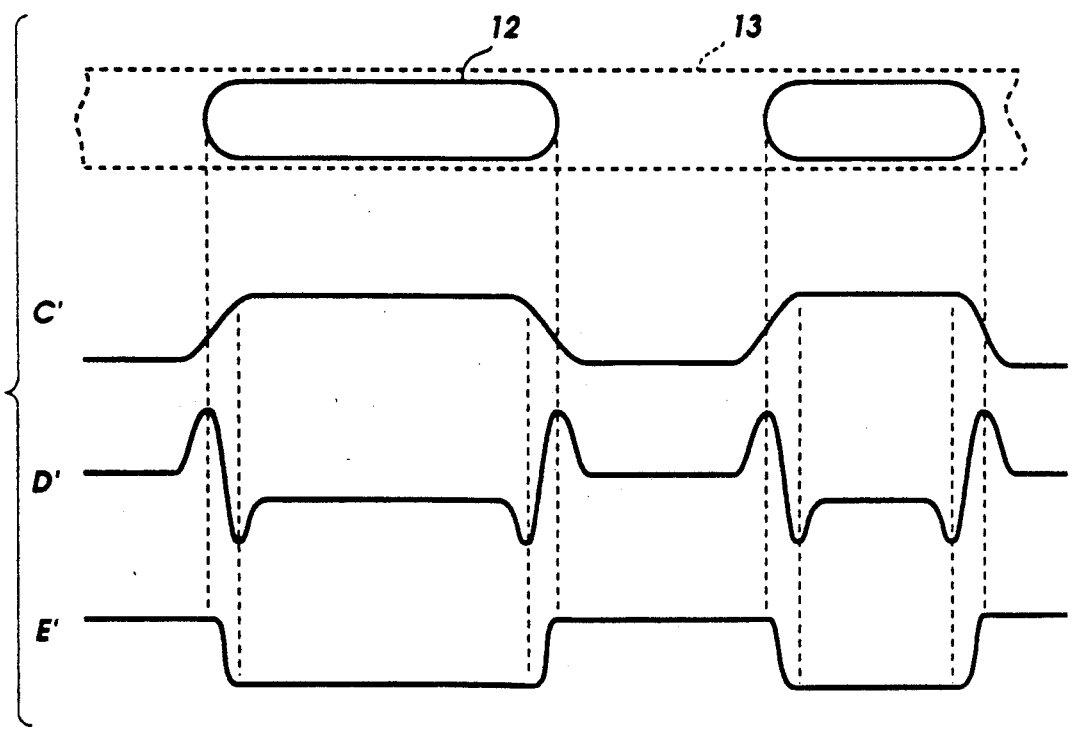
FIG. 5 is a waveform diagram associated with the FIG. 4 embodiment.

A second embodiment of the optical readout circuit is shown in FIG. 4 in which all the segments of photodetector 7 are shown in the form of photodiodes with their cathode terminals connected together to a first end of a resistor 20 the other end of which is connected to a voltage source +Vcc. The anode terminals of upper and bottom photodiodes U and B are supplied to the tracking control circuit 16 and those of left and right photodiodes L and R are connected together to a first end of a resistor 21 the other end of which is connected to ground. The first end of resistor 20 is connected by a dc-decoupling capacitor 22 to the negative input of a differential amplifier 24 and the first end of resistor 21 is connected by another dc-decoupling capacitor 23 to the positive input of the differential amplifier 24. The function of resistor 20 is to provide summation of all the output currents of the photodiodes and to determine the gain A of the summed output, while the function of resistor 21 is to sum the output currents of left and right photodiodes L and R and to determine the gain B of the summed output. The voltage developed by the resistor 20 is opposite in polarity to that developed by resistor 21 and therefore the waveform appearing at the negative input of differential amplifier 24 is a positive-going pulse C' as shown in FIG. 5, while the waveform D' appearing at the positive input is similar to the waveform D of the previous embodiment. By taking the difference between the waveforms C' and D', the differential amplifier 24 produces a waveform E' identical to the waveform E of the previous embodiment.

The present invention can be further modified as shown in FIG. 6. In this modification the outputs of the upper and bottom segments U and B are combined by adder 15 and supplied as an input g to a linear amplifier 30 with gain A to produce an output A·g. The outputs of the left and right segments L and R are combined together and supplied as an input b to a linear amplifier 31 having gain H to generate an output H·B. The outputs of linear amplifiers 30 and 31 are summed by an adder 32 to produce an output A·g+Hb. Since the formula A·g+H·b can be rewritten as A(g+b)+(H−A)b, the waveform generated by adder 32 can be made to be equal to the waveform E of the first embodiment if the amplification gain (H−A) is adjusted to a value equal to B.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. An optical reading apparatus comprising:
    means for irradiating a laser beam onto an optical recording medium in which binary signals are recorded in the form of pits arranged on a track;
    photodetector means having equally divided first, second, third and fourth segments arranged in a path of light reflected from said recording medium, said first and second segments being aligned in a direction parallel to said track and said third and fourth segments being aligned in a direction perpendicular to said track; and
    a readout circuit for deriving an output signal A·a+B·b as representative of said recorded binary signals from said first, second, third and fourth segments, where A and B represent constant values, a represents a summed value of output signals of said first, second, third and fourth segments and b represents a summed value of output signals of said first and second segments.

2. An optical reading apparatus as claimed in claim 1, wherein said readout circuit comprises:
    first combining means for combining the output signals of said first, second, third and fourth segments and producing a first output signal A·a;
    second combining means for combining the output signals of said first and second segments and producing a second output signal B·b; and
    third combining means for combining said first and second output signals to produce said output signal A·a+B·b.

3. An optical reading apparatus as claimed in claim 2, wherein said first combining means comprises a first amplifier with gain A for jointly and linearly amplifying the output signals of said first, second, third and fourth segments, said second combining means comprises a second amplifier with gain B for jointly and linearly amplifying the output signals of said first and second segments, and said third combining means comprises an adder for adding the output signals of said first and second amplifiers.

4. An optical reading apparatus as claimed in claim 2, wherein said first, second, third and fourth segments of said photodetector comprise first, second, third and fourth photodiodes, respectively, and wherein said first combining means comprises a first resistor having a first end connected to cathode terminals of said first potential, and said second combining means comprises a second resistor having a first end connected to anode terminals of said first and second photodiodes and a second end connected to a second potential, wherein said third combining means comprises a differential amplifier for taking a difference between voltages developed at said first ends of said first and second resistors.

5. An optical reading apparatus as claimed in claim 4, further comprising a first dc-decoupling capacitor connected between said first resistor and said differential amplifier and a second dc-decoupling capacitor connected between said second resistor and said differential amplifier.

6. An optical reading apparatus as claimed in claim 1, wherein said readout circuit comprises:
 a first linear amplifier with gain A for jointly amplifying the output signals of said third and fourth segments to produce an output signal A·a;
 a second linear amplifier with gain H for jointly amplifying the output signals of said first and second segments to produce an output signal H·b; and
 an adder for summing said output signals A·a and H·b to produce said output signal A·a+B·b, where B=H−A, a=g+b and g represents a summed value of the output signals of said third and fourth segments.

* * * * *

UNITED STATES PATENT AND TRADEMARK OFFICE
CERTIFICATE OF CORRECTION

PATENT NO. : 5,014,257
DATED : May 7, 1991
INVENTOR(S) : Yutaka Tanahashi et al.

It is certified that error appears in the above-identified patent and that said Letters Patent is hereby corrected as shown below:

Col. 3, line 16 delete "$\pi$" and insert --$\lambda$--.

Col. 6, line 7 delete "A·a" and insert --A·g--.

Col. 6, line 11 delete "A·a" and insert --A·g--.

Signed and Sealed this

Twenty-third Day of March, 1993

Attest:

STEPHEN G. KUNIN

*Attesting Officer*     Acting Commissioner of Patents and Trademarks